N. C. COLE.
CULTIVATOR.
No. 172,869.  Patented Feb. 1, 1876.
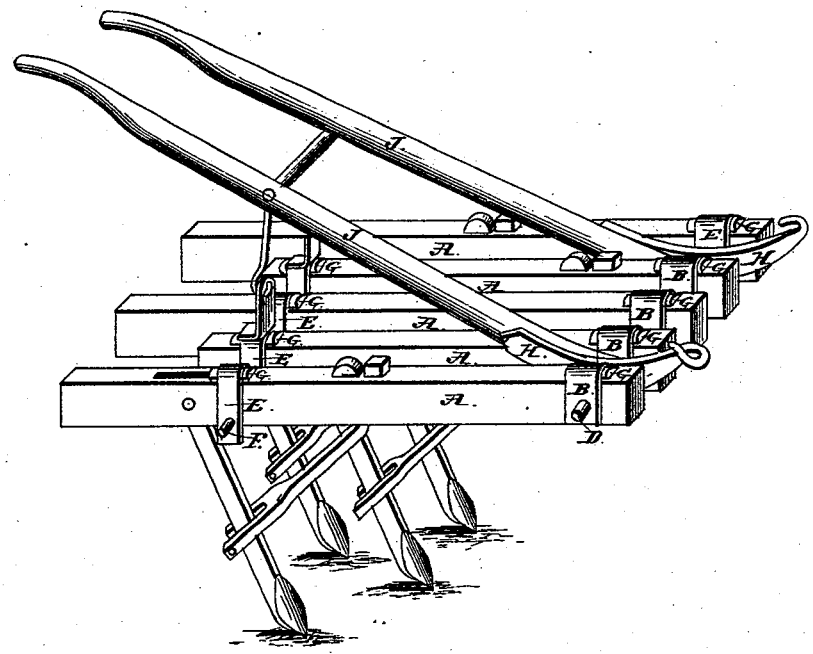
Witnesses:
L. D. Livermore.
A. Estabrook
Inventor:
Nelson C. Cole.

UNITED STATES PATENT OFFICE.

NELSON C. COLE, OF BEAVER DAM, WISCONSIN.

IMPROVEMENT IN CULTIVATORS.

Specification forming part of Letters Patent No. 172,869, dated February 1, 1876; application filed August 4, 1875.

*To all whom it may concern:*

Be it known that I, NELSON C. COLE, of the town of Beaver Dam, in the county of Dodge, in the State of Wisconsin, have invented certain new and useful Improvements in Cultivators, of which the following is a specification:

My invention relates to that class of cultivators which are used for cultivating corn and other plants.

My improvements are the attaching together of several of the tooth-bars and teeth of seeders and cultivators combined, such as are in use for seeding and cultivating small grain; and consists of metallic clasps or loops put over and upon the front ends of the tooth-bars, having holes in them to correspond with the holes in the front ends of said bars, and inserting a rod of iron through the holes in the loops and bars. I also put similar loops over the rear ends of the bars, and extending below them far enough to admit of the holes through them being below the tooth-bars. I insert through these holes a rod of iron. When all are in desired position I drive a wedge or like device on the top of the tooth-bars, between them and the loops. I also attach to the rod which is through the front end of the tooth-bars two handles, which extend in front, and have draft-hooks on their front ends.

The object of my invention is to use the tooth-bars and teeth of combined seeders and cultivators for the purpose of cultivating corn and other plants, thus making a complete cultivator at very little expense, and saving to the farmers and users having combined seeders and cultivators the additional expense of cultivator bars and teeth, all as hereinafter set forth.

In order to enable others skilled in the art to which my invention appertains to make and use the same, I will now proceed to describe its construction and operation, referring to the annexed drawing, which forms a part of this specification, and is a perspective view of my improvement in cultivators, similar letters on the drawings referring to similar parts of the machine.

A A represent the tooth-bars. B B represent the loops or clasps which go over and clasp the front ends of the tooth-bars A A, and through which the rod D passes. E E represent the loops or clasps which go over and clasp the rear end of the tooth-bars A A, the rod F passing through them under the tooth-bars. G G represent the wedges, which are driven between the loops or clasps E E and the top of the tooth-bars A A, thus holding all in position. H H represent the draft-hooks, which, with the handles J J, are attached to the rod D.

Having thus fully described my invention, what I claim as new, and desire to secure by Letters Patent, is—

In a cultivator, the loops or clasps B E, the rods D and F, wedges G G, and draft-hooks H H, in combination with the tooth-bars A A, as and for the purposes described and set forth.

NELSON C. COLE.

Witnesses:
L. D. LIVERMORE,
A. ESTABROOK.